United States Patent
Ghafir et al.

(10) Patent No.: US 6,202,159 B1
(45) Date of Patent: Mar. 13, 2001

(54) VAULT CONTROLLER DISPATCHER AND METHODS OF OPERATION FOR HANDLING INTERACTION BETWEEN BROWSER SESSIONS AND VAULT PROCESSES IN ELECTRONIC BUSINESS SYSTEMS

(75) Inventors: Hatem Ghafir; Dieter Poetzschke, both of Montgomery County, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,403

(22) Filed: Jun. 30, 1999

(51) Int. Cl.[7] ........................................... H06F 1/26
(52) U.S. Cl. ..................... 713/201; 713/151; 713/162; 713/164
(58) Field of Search ................................. 713/201, 151, 713/162, 164, 165, 166

(56) References Cited

U.S. PATENT DOCUMENTS

| | | |
|---|---|---|
| 4,771,459 | 9/1988 | Jansen . |
| 4,868,877 | 9/1989 | Fischer . |
| 4,914,176 | 4/1990 | Wang . |
| 5,005,200 | 4/1991 | Fischer . |
| 5,218,637 | 6/1993 | Angebaud et al. . |
| 5,263,165 | 11/1993 | Janis . |
| 5,481,610 | 1/1996 | Doiron . |
| 5,530,758 | 6/1996 | Marino . |
| 5,629,980 | 5/1997 | Stefik . |
| 5,640,501 | 6/1997 | Turpin . |
| 5,729,594 | 3/1998 | Klingman . |
| 5,742,643 | 4/1998 | Lee . |
| 5,745,574 | 4/1998 | Muftic . |
| 5,790,677 | 8/1998 | Fox . |
| 5,799,285 | 8/1998 | Klingman . |
| 5,850,422 | 12/1998 | Muftic . |
| 5,909,574 | * 6/1999 | Meyer ................................ 712/244 |
| 5,995,091 | * 11/1999 | Near et al. ......................... 345/302 |

* cited by examiner

Primary Examiner—Thomas R. Peeso
(74) Attorney, Agent, or Firm—Morgan & Finnegan, L.L.P.; Joseph C. Redmond, Jr.

(57) ABSTRACT

A vault controller in an electronic business system includes a dispatcher for servicing browser requests initiated by a user for conducting business with an enterprise or organization using a vault process. The dispatcher further responds to a secure depositor receiving requests from other vault processes running in the controller. The request is in the form a URL containing an application domain/local context and application name. The request is detected and processed by event creator which forms an event object definitive of the request in the URL. An event handler parses the event object and enters a vault system application registry to locate the application in a shared memory. The location of the application is passed to a server pool, which assign a processing thread to handle the request. The thread engages a context manager which decrypts and imports application domain, application function and local context information from external storage to process the request. The application is located in the shared memory and the request implemented. The context manager encrypts and exports the processed information to external storage and provides a return code in the response to the user. The return code is used to locate the context information in a subsequent request by the user. The requests received from other vault processes through the secure depositor are handled in like manner to the user request. After execution of a user request, the vault process loops for some defined time during which other requests are received from the user. The absence of requests causes the vault process to shut down and store the variables for the next user request which retraces the steps of the original request.

24 Claims, 3 Drawing Sheets

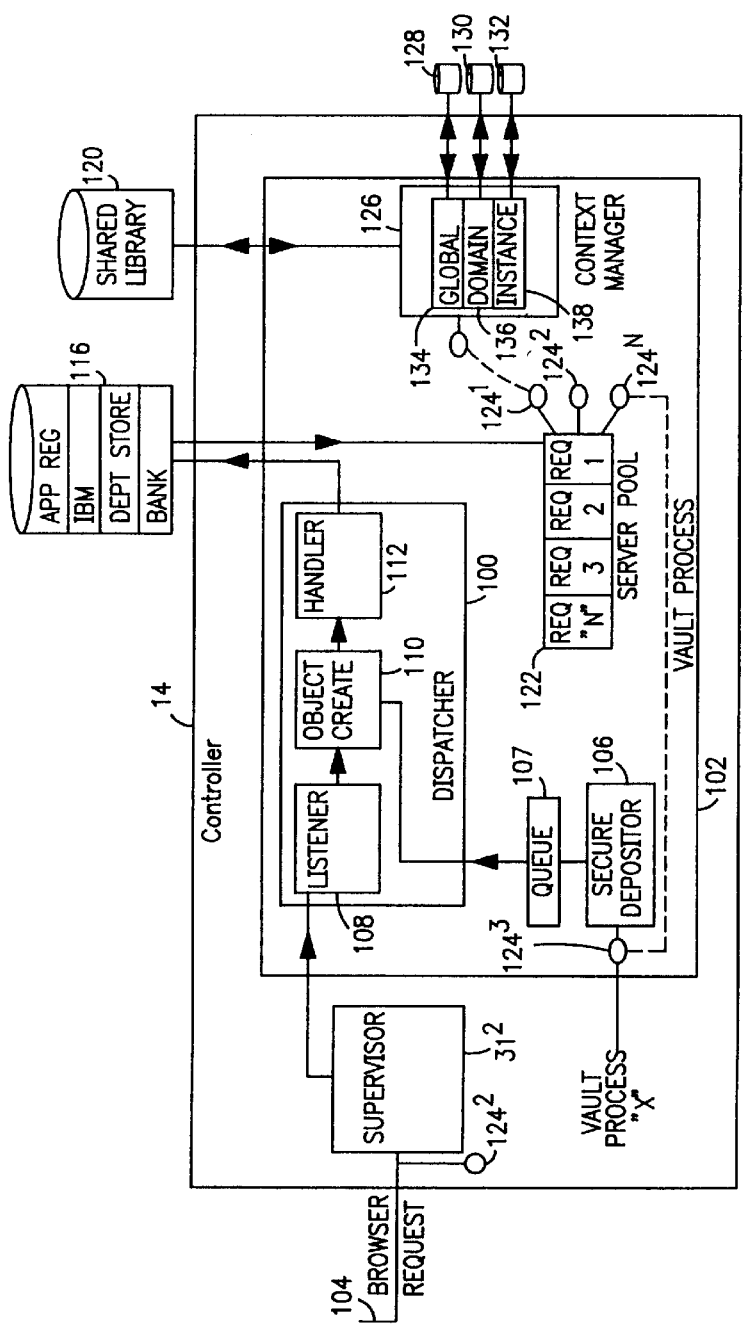

VAULT CONTROLLER DISPATCHER AND METHODS OF OPERATION FOR HANDLING INTERACTION BETWEEN BROWSER SESSIONS AND VAULT PROCESSES IN ELECTRONIC BUSINESS SYSTEMS

CROSS-REFERENCE TO RELATED APPLICATION

This application is related to Ser. No. 09/223,766 entitled "Secure Server Using Public Key Registration And Methods Of Operation", filed Dec. 31, 1998 (SE9-98-003/1963-7246), assigned to the same assignee as that of the present invention and fully incorporated herein by reference.

This application is further related to the following co-pending applications, all assigned to the same assignee as that of the present invention and fully incorporated herein by reference:

1. Ser. No. 09/223,764, entitled "A Secure Communication System And Method Of Operation For Conducting Electronic Commerce Using Remote Vault Agents Interacting With A Vault Controller", filed Dec. 31, 1998 (SE9-98-021/1963-7260).
2. Ser. No. 09/223,834, entitled "Vault Controller Based Registration Application Serving Web Based Registration Authorities and End Users for Conducting Electronic Commerce In A Secure End-to-End Distributed Information System", filed Dec. 31, 1998 (SE9-98-2/1963-7261).
3. Ser. No. 09/223,765, entitled "Vault Controller Supervisor And Method Of Operation For Managing Multiple Independent Vault Processes & Browser Sessions For Users In An Electronic Business System", filed Dec. 31, 1998 (SE-98-017/1963-7256).
4. Ser. No. 09,343,231, entitled "Vault Controller Secure Depositor For Secure Communication", filed Jun. 30, 1998 (SE9-98-019/1963-7259).

BACKGROUND OF THE INVENTION

1. Field of the Invention

This invention relates to a secure end-to-end communication system and methods of operation for conducting electronic business. More particularly, the invention relates to a vault controller dispatcher and methods of operation for processing requests to applications executable in a secure manner within a vault.

2. Background Discussion

Traditionally, organizations such as retailers, banks, and insurance companies, in conducting electronic business, register their customers or users and control their access to business software applications with a user identification ("user ID") and password. The user ID and password establish a user's identity for accessing secured information. The password is the "virtual key" that authenticates a user. However, a password does not provide the security needed for electronic business. Passwords have the following limitations:

(a) can be compromised during log-on by on-lookers;
(b) can be easily intercepted on the Internet if the transaction is not secured with a secure web protocol, such as secure sockets layer;
(c) authenticate a user to a host, but not a host to a user;
(d) can be discovered using automated "trial and error" techniques;
(e) do not protect transmitted information; and
(f) do not ensure that access is limited to authorized entities and applications.

A new approach to conducting electronic business on the Internet is described in the cross-referenced application. In this approach, digital keys replaced user identification-password pairs. Public key cryptography uses mathematically related public-private key pairs. Only the private key can decrypt the information the public key has encrypted. Only the public key can verify signature performed by the private key. The public key can be made available to any one. The private key is kept secret by the holder.

Just as digital keys are replacing user identification-password pairs in electronic business, digital signatures are replacing physical signatures. A digital signature is a coded message affixed to a document or data that helps guarantee the identity of the sender, thereby providing a greater level of security than a physical signature. A digital signature identifies the sender because only the sender's private key can create the signature. The key also helps ensure the content of the signed message cannot be altered without the recipient being able to discover that the message has been altered.

Digital certificates are also replacing their physical counterpart—hard copy credentials—in electronic business. A digital certificate, issued by a certification authority, vouches for (or certifies) the key of an individual, software application, organization or business. The certificate performs a role similar to that of a driver's license or medical diploma—the certificate certifies that the bearer of the corresponding private key is authorized (by an organization) to conduct certain activities with that organization.

However, the life cycle of digital certificates is similar to that of physical certificates. Digital certificates are issued for a specific amount of time. The certificate may be temporarily suspended under certain conditions and reissued at a later time. The certificate may be permanently revoked by the organization. Finally, digital certificates expire. For secure end-to-end communication in electronic business, the certificate must be validated to determine whether the certificate has expired, been revoked or suspended.

Digital certificates are issued through authorized registrars known as Registration Authorities (RAs). The authorities determine whether the applicant should be authorized to access secure applications or services and set in motion the processes to issue a certificate. A Certification Authority (CA) issues the digital certificate after approval by the Registration Authority. The certificate is a binding between a public key and an identity, e.g. a person, organization or computer device. The certitude includes a subject name; issuer name; public key; validity period; unique serial number; CA digital signature. The CA guarantees the authenticity of the certificate through its digital signature. The certificate may be revoked at any time. The serial numbers of revoked certificates are added to a Certification Revoked List ("CRL") published in an X.500 Directory based on a standard defined by the International Telecommunications Union ("ITU"). The X.500 standard is now being used to implement a "white pages" for the Internet service. That is, a directory of people, computers, services, and of course electronic mail addresses. This on-line directory provides a single, global source of information that is constantly updated.

IBM "Vault" technology, described in the related application Ser. No. 08/980,022, supra provides strong authentication of clients and servers using digital keys and digital certificates for conducting electronic business. "Vault" technology is described in the above cross-related application. Briefly stated, "Vault" technology provides a secure environment in a web server using a vault controller (hereinafter, web server-vault controller) for running a secure web-based registration process and enabling secure application execution. The controller provides security from other processes running on the same server and secure areas or personal storage vaults to which only the owner has a key. System operators, administrators, certificate authorities, registration authorities and others cannot get to stored information or secure processes in such personal vaults. Combined with a Secure Sockets Layer (SSL) protocol, the controller enables secure registration transactions that require multiple sessions using personal vaults. SSL, an IETF standard communication protocol, has built-in security services that are as transparent as possible to the end user and provides a digitally secure communication channel. The personal vault is owned by a particular platform Identification (ID), e.g. a UNIX ID account that is linked to a user with a specific vault access certificate. The vault is encrypted and contains an encryption key pair and signing key pair, both of which are password protected. The content of the vault is encrypted using the vault encryption key. Each vault has a unique distinguished name in an X.500 directory that provides storage for specific items essential to a Public Key Infrastructure (PKI) using digital certificates, certificate authorities, registration authorities, certificate management services, and distributed directory services used to verify the identity and authority of each party involved in any transaction over the internet. The common name portion of a distinguished name is based on a unique vault ID. In addition, the controller provides a unique map between the vault ID (which identifies the UNIX user account and the user's home directory) and the vault access certificate which enables a user to access a vault process.

What is needed in Vault Technology is a system and method for (i) processing user browser requests and servicing these requests by launching the corresponding applications in the user's own vault, thereby providing a secure application execution environment in which the application only has access to the user's own vault contents; and (ii) processing requests from other vaults and executing the corresponding applications securely in the vault environment.

SUMMARY OF INVENTION

An object of the invention is a vault controller dispatcher in a vault process for handling interactions between user browser sessions and other vault process requests in a timely, efficient process without burdening the resources of a vault controller in responding to the request.

Another object is a vault controller dispatcher in a vault process creating a service pool of multiple processing threads for handling requests and responses.

Another object is a vault controller dispatcher in a vault process responsive to requests encoded in a URL by linking the request to an application domain, application function and context of the application.

Another object is a vault controller dispatcher in a vault process for establishing a persistent "state" environment for application execution.

These and other objects, features and advantages are achieved in an electronic business system in which a vault controller is coupled through a secure network to a user browser. Requests are initiated by the user to conduct business with an application stored in persistent storage, the location of which is identified in a vault application registry. The controller includes a vault process (es) for executing the application in a secure vault. The vault process includes a dispatcher for servicing the browser requests initiated by a user using a URL format. The URL is parsed by the dispatcher and its components, namely an application domain, local context, and application alias, are extracted from the URL and inserted in an event object. The application domain and application alias are then used as an index into a vault application registry which contains information about all applications housed on the vault controller system. The information returned from the application registry contains the path to a shared library and the function name of the application requested by the user. The dispatcher then loads, on demand, the shared library containing the required application. The dispatcher then uses a special mapping technique to convert the function name into a function pointer for the application requested in the URL. The on-demand loading of the application shared library plays a significant role in reducing the resource consumption and improving the response time of the vault controller server. The vault controller server contains many applications from different application providers, and having to load all applications by the vault process when the process starts would pose a great burden on system resources and would greatly affect system performance. The technique used by the dispatcher described above causes only the applications requested by the user to be loaded, on demand, by the vault process. After loading the application shared library and converting the function name to a function pointer, the dispatcher queues a request to a server pool of multiple processing threads originally started by the dispatcher. When one of the threads in the server pool becomes idle, the dispatcher de-queues the pending event object request to execute the desired function. Before executing the application, the local context extracted from the URL is used, together with the application domain, as an index into a pool of context variables that belong to the vault. The application is then executed by the server pool, having access to the variables that belong to the correct context. The context variables enable applications to maintain state between different stages of the application, thereby overcoming the stateless nature of the HTTP protocol. When the application finishes execution, the application may choose to store more variables to be made available to the next stage of the application under the same context. It is important to note that the local context imbedded in the URL is totally transparent to applications. When an application sends the output to the user, the output is intercepted by the dispatcher and is parsed for any URL information. Inserting the application domain and local context information applicable to this particular thread of application execution then modifies each URL. The modified output is then sent back to the browser. When the browser user clicks on any LRL to execute the next phase of the application, the URL presented to the dispatcher already contains the proper application domain and local context required to resume the application where it left off. In addition to servicing browser user requests, the dispatcher also processes requests received from other vaults through a secure depositor. Processing of these requests is substantially the same as that for servicing URL requests. The vault process waits for new requests until a certain configurable inactivity period is reached, at which point the vault process shuts down gracefully after performing a cleanup process.

DESCRIPTION OF DRAWING

The invention will be further apprehended from the following detailed description of a preferred embodiment taken in conjunction with an appended drawing, in which:

FIG. 2A is a representation of a vault controller dispatcher in the vault process in FIG. 1.

FIG. 2B is a representation of an event object created in the system of FIG. 2A.

FIG. 3 is a representation of a Uniform Resource Locator (URL) for implementing a user Request to the vault controller dispatcher in FIG. 2A.

DETAILED DESCRIPTION OF A PREFERRED EMBODIMENT

Figure 1:
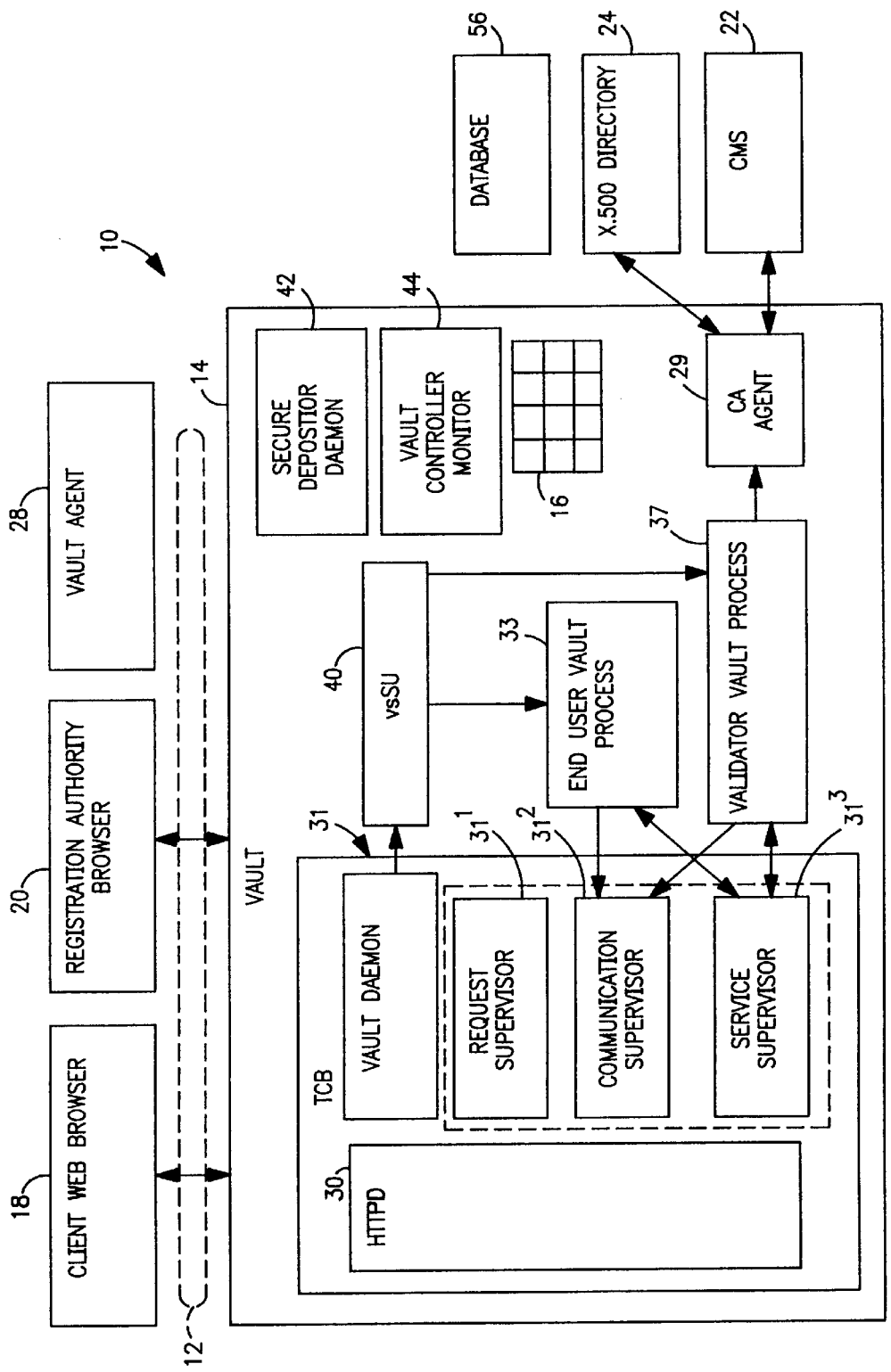
FIG. 1 is a representation of a vault controller in a secure end-to-end communication system interacting with users, vault agents, and registration authorities for conducting electronic business using a vault process and incorporating the principles of the present invention.

In FIG. 1, a secure-end-to-end communication system 10 for conducting electronic business in a distributed information system 12, e.g., the Internet. The system includes an enhanced web server-vault controller 14 which provides processes and storage in personal vaults 16 for users 18, Registration Authorities 20 (RAs), certificate management system 22, and an X.500 directory 24. An external vault agent 28 is an optional lightweight vault process designed to run remotely at a customer's location. The agent incorporates a small subset of the vault process functionality. The subset enables the agents to exchange secure messages with vault processes running under the control of the vault controller. Further details of the vault agent are described in copending application Ser. No. 09/223,764, Filed Dec. 31, 1998 (SE9-98-021/1963-7260), supra.

The personal vaults 16 in the controller provide a secure environment for executing programs and applications on behalf of the designated user. Personal vaults and their contents are accessible from SSL-enabled web browsers operated by the user 18. In one form, a personal vault is a directory in a storage area, e.g. a disk drive. Access to personal vaults does not require knowledge of a vault password and keys. Access to personal vaults requires a vault access certificate and a private key. Information stored in personal vaults is protected against disclosure to unauthorized persons (such as System Administrators and other vault owners) by encryption; against tampering by digital signature; and against untrusted communications with unknown parties by authentication using digital certificates. Information can also be transmitted securely to other local vaults within the controller and with external or remote vaults through a secure depositor (not shown) included in each vault, and to be further described hereinafter in conjunction with FIG. 2A.

In conducting electronic business, the registration authority 20 reviews each user registration request that is submitted; validates the request; and then approves or rejects the request. The registration decision is provided to a certification agent 29, which uses the certificate management system 22 to issue, suspend, resume, renew or revoke X.509v3 certificates to users whose registration requests are approved. Additionally, the certification authority publishes certificates, Certificate Revocation Lists (CRL), and policy information of organizations relative to electronic business in an X.500 directory 24. The X.509v3 certificates, CRL's, CA policies and other information about registered users and servers are stored in the X.500 Directory. An authorized user or software application can find a public key certificate for a particular person or server by searching the Directory for that person's or servers unique distinguished name or other relevant information. The Distinguished Name (DN) is a unique name of a data entry stored in the X.500 Directory. The DN uniquely identifies the position of an entry in the hierarchical structure of the Directory. Further details of the Registration and Certification Authorities are described in Ser. No. 09/223,834, filed Dec. 31, 1998 (SE9-98-022/1963-7261), supra.

Continuing in FIG. 1, the vault controller provides secure end-to-end communication using browser client authentication and SSL protocol. The browser request is encrypted and sent to the vault controller along with a vault access certificate. The controller consists of three major components. A web server 30, e.g., Lotus Domino Go web server; a vault process supervisor 31; and vault processes 33. The Lotus Domino Go web server is a secure scalable, high performance, transaction-ready web server that allows a web browser to interface with vault controller; allows a web browser to communicate securely with vault controller software via the SSL protocol; and authenticates a user's digital certificate and key.

The vault process supervisor validates and maps the vault access certificate to a user ID and password. In a first step a vault process 33 is then launched on behalf of that user to handle the user's request. In a second step, the vault process supervisor maintains a state table for determining whether a vault process is already running on behalf of the user. If a vault process is already running, the supervisor will attach the user to the existing vault process. In a third step, the vault process responds to the user request. The vault process shuts down after a predetermined period of inactivity, but until that period is reached, the process may be automatically activated when a user request is received. Further details of the vault process supervisor are described in Ser. No. 09/223,765, Filed Dec. 31, 1998, (SE9-98-017/1963-7256), supra.

Each vault process is multithreaded and able to handle multiple, simultaneous requests from the users. Additionally, each thread has its own virtual local storage area allowing it to maintain "state" across multiple browser-server interactions. This virtual storage is achieved through the use of the context variables described earlier.

Certificates in the vault enable users to encrypt and sign data (through the secure depositor) for any other user on the system that has a vault. This information is safely encrypted in the public key of the recipient. The public key of the recipient is obtained from the X.500 directory. In addition, if signing is performed, the signing private key stored in the vault is used for the signing operation, and the recipient uses its own signing pubic key to verify the signed data.

In FIG. 2A, a dispatcher 100 runs in each user vault 16 (see FIG. 1) as a part of a vault process 102 servicing a user request 104 transmitted to a service control supervisor 312 in the controller 14. The user vault and vault process are described in Ser. No. 08/980,022 filed Nov. 26, 1997 (SE9-97-005/1963-7131-US1) and Ser. No. 09/223,765 filed Dec. 31, 1998 (SE9-98-017). The function of the dispatcher is to handle user requests to the vault process coming from the service supervisor $31^3$ (see FIG. 1) or from a secure depositor 106 responsive to requests from other vault processes running in the controller. The dispatcher includes a listening port 108 detecting the presence of a URL 300, shown in FIG. 3, incorporating user requests and containing the following information:

(a) Website=demo.registry
(b) Servicing Organization=application domain
(c) Organization Business function=application function
(d) Context for Application function variables=local instance With the presence of a URL, the listening logic provides an input to an object creator 110 which translates the URL into an object in a form suitable for processing by the business organization. An object, shown in FIG. 2B, contains the following information:
(a) Posted data or information 200 supplied by user available in the form of a collection of name and value pairs.
(b) The URL 300 as a source of the request.
(c) Application domain 204 which is the name of the business organization, e.g., requests IBM, Sears, FORD, City Group servicing the requests.
(d) Application function 206 which is a particular action to be performed by the application, i.e., loan requests; product purchase; service requests; etc.
(e) the local context or instance 208 which is an index into a set of variables providing a 'state' for the application.

The event object is passed to an event handler 112 which parses the URL into individual units to obtain the application domain, application function and instance. After parsing, the handler accesses a vault server application registry 116 to find the location of the application domain in persistent storage 120. The registry 116 provides the shared library path in persistent storage 120, and function name corresponding to the application domain and function alias provided in the URL. Based on the library name and the library location for the application domain, the event handler 112 in the dispatcher 100 loads the shared library into the vault process address space. The event handler 112 in the dispatcher then calls the shared library entry point to map the function name extracted from the URL into a function pointer. A request is then queued to a server pool 122 which has multiple processing threads $124^1$, $124^2$, $124^N$ for handling application execution. The queued request contains, among other things, the function pointer obtained earlier which represents a direct mapping from the application domain and the function alias name encoded in the URL. Before executing the application, the server pool uses the application domain and the local context variables from the event object to gain access to all persistent data associated with this context from previous execution phases of the same application. The application, therefore, has access to all persistent data for this context in addition to new data sent by the user as part of the current HTTP request. Context manager 126 implements "state" maintenance in the vault process since the http protocol is "stateless" with respect to user requests. The context manager implements three levels of state variables that are made available to applications executing in vault processes. The highest level is a set of global variables 134 that pertain to the entire user vault and are not related to any particular application executing in the vault environment. Global variables are, therefore, accessible by any application running in the vault. The next lower level of context variables managed by the context manager is the domain context variables 136. The domain variables are variables that apply to all applications for a particular application domain. The lowest level of context variables are the variables associated with a given local context 138. Only applications launched under a given local context, extracted from the browser URL request, will gain access to the local context variables. All context variables are stored encrypted in storage 128, 130, 132 using the vault owner public key, thereby allowing only the vault owner to gain access to these variables using the vault private encryption key stored in the vault profile.

In browser request handling by the dispatcher, it is the application responsibility to store or not store the context variables using the services offered by the context manager 126. This is controlled by the return code returned from the application. In one embodiment, a return code of zero in the response indicates the local instance has been destroyed and subsequent user or process requests will need to establish a new context identification. When the return code is non-zero the context is stored in the context disk 132. Details of the context manager are described in copending application, Ser. No. 09/343,231, entitled "Vault Controller Context Manager And Methods Of OperationFor Maintaining State Information Between Successive Browser Connections Enabling Multiple Applications to Share Data In An Electronic Business System", filed Jun. 30, 1999, (SE9-98-020/1963-7259), supra, and fully incorporated herein by reference.

Within the vault process 102, all process requests between vault processes are handled by a secure depositor 106 which receives the request in encrypted and signed form and passes the request through a queue 107 to the object creator 110, after decryption and verification. The secure depositor requests consist of a header and the actual message. The header has information on the application domain and the function to be executed in the recipient vault. When the handler 112 in the vault dispatcher receives a message from the secure depositor, the handler retrieves the message handler and parses it into an application domain and a function to be executed. If a proper application has already been executing in the recipient vault and can process the received message, the vault dispatcher simply signals the application. If no application is running that can process the received message, the dispatcher in the recipient vault starts a new application and passes to it a reference to the message to be processed. The vault dispatcher processes the request before executing the application. The object creator 110 processes the request in a manner similar to that described earlier for browser requests 104. An event object is created and passed to the event handler 112. The request is parsed by the handler and the vault server application registry 116 is accessed to locate the library path and function name. The shared library is loaded in the vault process address space and the mapping is performed by the vault dispatcher from the function name to the corresponding function pointer. The function pointer is then queued to the server pool which picks up the request as described for browser requests.

Figure 4:
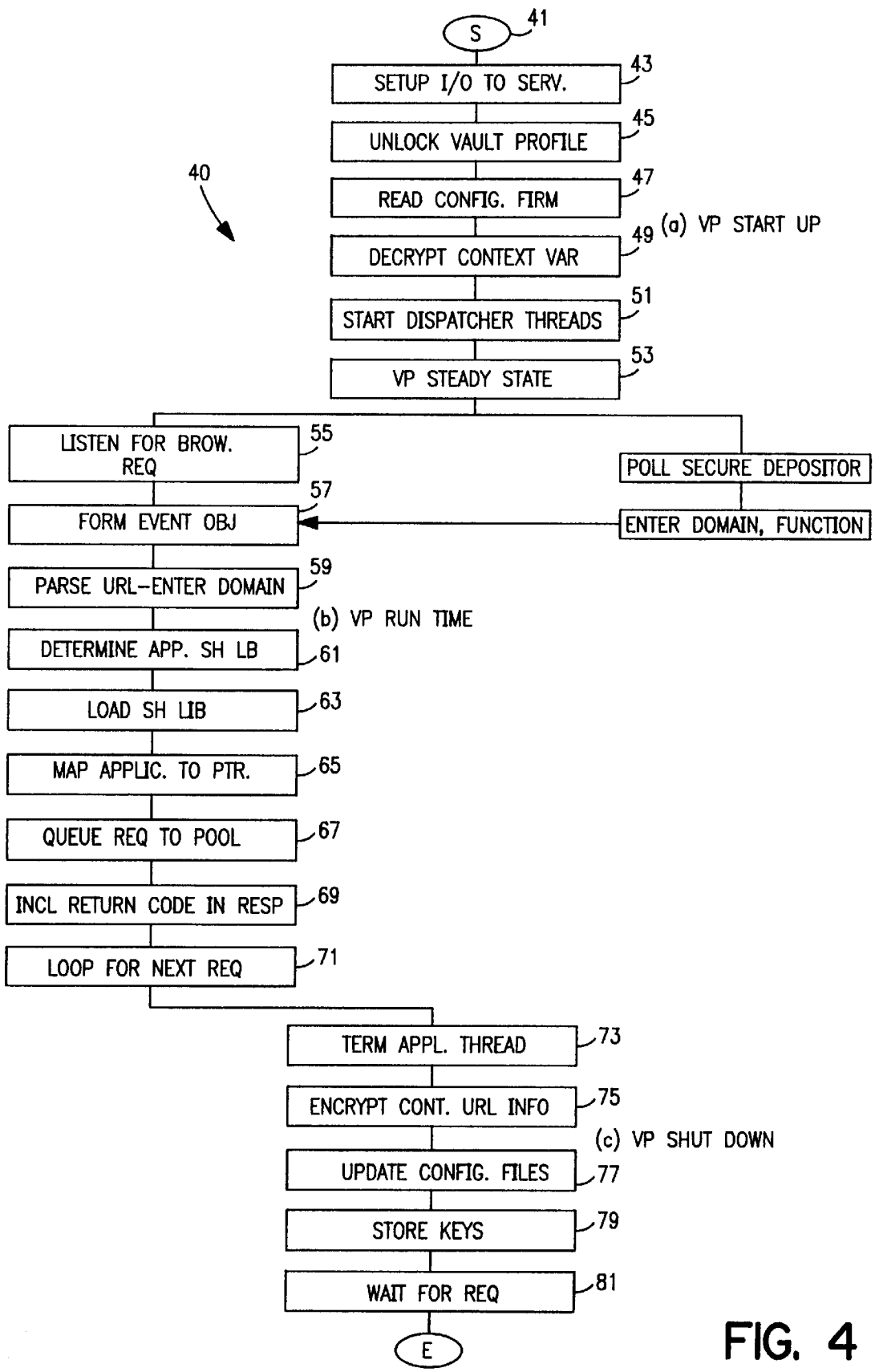
FIG. 4 is a flow diagram implemented in the vault controller of FIGS. 1 and 2A for handling user requests in a secure environment.

FIG. 4 in conjunction with FIG. 2A describes the dispatcher operation in a vault process 40 in terms of three phases: (a) vault process start-up; (b) vault process run time and (c) vault process shut down. A vault process is a program that runs in a vault on behalf of the vault owner. The process carries out requests and returns responses to the requester. The services provided by a vault process are dictated by an application program supplied by an organization in the form of a shared library for purposes of conducting electronic business. Vaults and vault process are further described in Ser. Nos. 09/223,766 and 09/223,765 (SE9-98-003/1963-7246)(SE9-98-017/1963-7256), supra. The vault process is activated by the service supervisor $31^3$ (See FIG. 1) after the supervisor processes a user request including a vault access certificate number. The vault access certificate is used by the supervisor to derive a user ID and password for the vault owner.

The service supervisor passes the ID and password onto the vault process 40 and establishes an input and output stream in block 43. With the password, the vault process unlocks a vault process profile in block 45 stored in the vault and provides a set of encryption/decryption keys and signing/verification keys for security purposes. The keys are used by the process for exporting and importing information to storage outside the vault process, e.g., 116, 128, 130, 132, etc. Configuration files for the process are accessed in block 47 to support application domains in a vault server application registry 116 (See FIG. 2A). The context variables stored in 128, 130, and 132 are imported and decrypted in block 49 after which the dispatcher is started in block 51. As a part of starting the dispatcher, the server pool 122 is activated for executing applications. The threads $124^1$, $124^2$ and $124^N$ run under the vault controller and are used to execute application functions in response to either browser requests or secure depositor requests from other vaults. At this point the vault process is in steady state 53 and ready to perform run time.

In run time, a browser request with or without a context identification is provided to the dispatcher on the browser handling thread. The dispatcher listens in block 55 for the request in the form of an URL. The dispatcher forms an event object in block 57 and passes the object to the handler 112. The handler parses the URL in block 59 and the application domain, local context and application function are extracted from the object in block 61. The handler 112 accesses the application registry 116 to determine the location of the shared library of the application domain in block 61 and perform the mapping of function alias in the URL to application name. With location, the application shared library is loaded in block 63 and the application is mapped to a function pointer in block 65. A request is then queued to the server pool in block 67. When any of the server pool threads 122 becomes idle, the queued request is read and the application is executed. Before executing the application, the appropriate context variables are made available to the application using the context manager. The return code from the application determines whether context variables need to be encrypted to disk or not in block 69. The server pool then picks up the next queued request in block 71.

Simultaneously with the processing of a browser request, the dispatcher in block 56 the queue to retrieve vault process requests. The application domain and application function are extracted 58 from the requests and the process re-traces the steps in blocks 57–71 for servicing a browser request.

During this period of servicing browser requests and vault process requests, the server pool 122 retrieves the request in order and executes the requests in conjunction with the context manager. If a request is not received within some predetermined time interval, the vault process is shut down in block 73 by terminating the server pool application threads. The application and context information are encrypted in block 75 by the context manager 126 and exported to external storage 128, 130, and 132. The configuration files are updated in block 77 and the process encryption/decryption keys are stored in block 79 and waits for a request in block 81.

While the invention has been shown and described in conjunction with the preferred embodiments, various changes may be made therein without departing from the invention as defined in the intended claims in which:

1. In a vault controller for conducting electronic business between a message source and an application running in a secure vault in the controller, a dispatcher in the secure vault for processing messages between the application and the message source, comprising:

a message listening source for receiving messages;

an event creator responsive to the message listening means for forming an event object;

an event handler means responsive to the event object for parsing the message and extracting an application domain, a local context, and an application alias name;

means for locating the application domain and application alias name in a shared library; and a server pool responsive to the event handler for executing the application and providing a response for transmission to the message source in a non-stateless environment.

2. The system of claim 1 further comprising:

a secure depositor in the secure vault coupled to the controller for receiving requests from other vault processes running in the controller.

3. The system of claim 1 further comprising:

a secure depositor queue and a queue handler in the secure vault coupled to the event creator for transmitting requests from other vault processes running in the controller to the dispatcher for processing.

4. The system of claim 1 further comprising:

a context manager in the secure vault responsive to the server pool for executing the user request.

5. The system of claim 1 further comprising:

means for processing user browser requests and servicing these requests by launching the corresponding applications in the user's own vault, thereby providing a secure application execution environment in which the application only has access to the user's own vault contents; and means for processing requests from other vaults and executing the corresponding applications securely in the vault environment.

6. The system of claim 1 further comprising:

means for handling interactions between user browser sessions and other vault process requests in a timely, efficient process without burdening the resources of a vault controller in responding to the request.

7. The system of claim 1 further comprising:

means for creating a service pool of multiple processing threads for handling requests and responses.

8. The system of claim 1 further comprising:

means for linking a user request to an application domain, application function and context of an application.

9. The system of claim 1 further comprising:

means for loading, on demand, the shared library containing the required application.

10. The system of claim 1 further comprising:

means for converting a function name into a function pointer for an application contained in a user request.

11. The system of claim 1 further comprising:

means for loading only the application contained in the user request.

12. The system of claim 1 further wherein the message is a URL containing descriptors of the application domain/local context and application name.

13. In a vault controller, an application running in a secure vault, a method for processing messages between the application and a message sources, comprising the steps of:

listening for requests from the message source;

forming an event object from the requests;

parsing the requests and extracting an application domain, a local context and an application alias name;

determining the location of the application and application alias name in a shared library;

loading the application in the shared library;

mapping the application to a function pointer;

queuing a request to a server pool for execution of the application; and providing the message source with a response to the request.

14. The method of claim 13 further comprising the step of:

loading in the shared memory only the application contained in the request.

15. The method of claim 13 further comprising the step of:

receiving requests from other vault processes running in the controller.

16. The method of claim 13 further comprising the step of:

processing user browser requests and servicing these requests by launching the corresponding applications in the user's own vault, thereby providing a secure application execution environment in which the application only has access to the user's own vault contents.

17. The method of claim 13 further comprising the step of:

handling interactions between user browser sessions and other vault process requests in a timely, efficient process without burdening the resources of the vault controller in responding to the request.

18. The method of claim 13 further comprising the step of:

creating a service pool of multiple processing threads for handling requests and responses.

19. The method of claim 13 further comprising the step of:

linking a user request to an application domain, application function and context of an application.

20. The method of claim 13 further comprising the step of:

converting a function name into a function pointer for an application contained in the user request.

21. The method of claim 13 wherein the message is a URL containing descriptors of the application domain/local context and application name.

22. An article of manufacturing:

a program medium executable in a computer system for conducting electronic business between message sources running in a secure vault contained in a controller, the program medium comprising:

program instructions for listening to the message source and receiving messages;

program instructions responding to the messages and forming an event object;

program instructions responsive to the event object for parsing the message and extracting an application domain, a local context, and an application alias name;

program instruction for locating the application domain and application alias name in a shared library; and program instruction for executing user requests in the application and providing a response to the controller for transmission to the user in a non-stateless environment.

23. An article of manufacturing:

a program medium executable in a computer system for conducting electronic business between a message source and an application running in a secure vault contained in a controller, the program medium comprising:

program instructions for listening to requests from the message source;

program instructions forming an event object from the requests;

program instructions parsing the requests and extracting an application domain, a local context and an application alias name;

program instructions determining the location and function of the application and function name in a shared library;

program instructions loading the application in the shared library;

program instructions mapping the application to a function pointer;

program instructions queuing a request to a server pool for execution of the application; and program instructions providing a message source with a response to the request.

24. In a vault controller, a message source and an application running in a secure vault, a dispatcher in the secure vault for processing messages between the application and message source, comprising:

means for receiving messages;

means responsive to the messages for forming an event object;

means for parsing the message and extracting an application domain, a local context and application alias name;

means for locating the application domain and application alias name in a shared library; and means for executing the application and providing a response for transmission to the message source in a non-stateless environment.

* * * * *